US012692834B2

(12) United States Patent
Thorsen et al.

(10) Patent No.: US 12,692,834 B2
(45) Date of Patent: Jul. 28, 2026

(54) DETERMINING AN ACTION TO ALLOW RESUMPTION WIND TURBINE OPERATION AFTER A STOPPAGE

(71) Applicant: VESTAS WIND SYSTEMS A/S, Aarhus N. (DK)

(72) Inventors: Morten Tim Thorsen, Tilst (DK); Roberto Ugo Di Cera Colazingari, Oporto (PT); Casper Hillerup Lyhne, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 571 days.

(21) Appl. No.: 17/947,546

(22) Filed: Sep. 19, 2022

(65) Prior Publication Data

US 2023/0105839 A1 Apr. 6, 2023

(30) Foreign Application Priority Data

Sep. 17, 2021 (EP) ..................................... 21197439

(51) Int. Cl.
　*F03D 7/04* (2006.01)
　*F03D 7/02* (2006.01)
(52) U.S. Cl.
　CPC ........... *F03D 7/046* (2013.01); *F03D 7/0264* (2013.01); *F03D 7/045* (2013.01); (Continued)
(58) Field of Classification Search
　CPC ........ F03D 7/0264; F03D 7/045; F03D 7/046; F05B 2270/107; F05B 2270/402; F05B 2270/709
　See application file for complete search history.

(56) References Cited

U.S. PATENT DOCUMENTS 9,062,653 B2 * 6/2015 Brath ...................... F03D 17/00
9,745,958 B2 * 8/2017 Agarwal ............... F03D 7/0276
(Continued)

FOREIGN PATENT DOCUMENTS

WO 2016086360 A1 6/2016
WO 2021052686 A1 3/2021

OTHER PUBLICATIONS

European Patent Office, Extended European Search Report for Application 21197439.9-1007 dated Mar. 3, 2022.
(Continued)

*Primary Examiner* — Nathaniel E Wiehe
*Assistant Examiner* — Jason G Davis
(74) *Attorney, Agent, or Firm* — Patterson + Sheridan, LLP; Gero G. McClellan

(57) ABSTRACT

The invention provides a wind turbine method that includes receiving alarm state data indicating that the wind turbine has entered an alarm state in which operation of the wind turbine has stopped, and receiving sensor data from a plurality of sensors of the wind turbine indicative of operating conditions associated with the wind turbine. When the alarm state data is received, the method includes executing a trained machine learning model based on the received sensor data and the alarm state to obtain an output, where the machine learning model is trained based on historical data associated with a plurality of wind turbines, the historical data being indicative of the plurality of wind turbines previously being in the alarm state. The method includes providing, based on the obtained output, an action to be performed to allow the wind turbine to resume operation.

17 Claims, 3 Drawing Sheets

(52) U.S. Cl.
    CPC ... *F05B 2270/107* (2013.01); *F05B 2270/402*
                    (2013.01); *F05B 2270/709* (2013.01)

(56)                References Cited

U.S. PATENT DOCUMENTS

| | | | | |
|---|---|---|---|---|
| 9,856,855 | B2 * | 1/2018 | Kjær ..................... | F03D 7/0292 |
| 10,954,919 | B1 * | 3/2021 | Evans ..................... | F03D 7/048 |
| 10,975,841 | B2 * | 4/2021 | Beckerman ........... | F03D 7/0276 |
| 2010/0138182 | A1 | 6/2010 | Jammu et al. | |
| 2014/0304201 | A1 * | 10/2014 | Hyldgaard ............. | G05B 13/00 |
| | | | | 706/12 |
| 2019/0203699 | A1 | 7/2019 | Muller et al. | |

OTHER PUBLICATIONS

Office Action received for European Patent Application No. 21197439. 9, mailed on Jan. 9, 2025, 4 pages.
Intention to grant received for European Patent Application No. 21197439.9, mailed on Aug. 22, 2025, 6 pages.
Decision to grant received for European Patent Application No. 21197439.9, mailed on Nov. 20, 2025, 2 pages.

* cited by examiner

DETERMINING AN ACTION TO ALLOW RESUMPTION WIND TURBINE OPERATION AFTER A STOPPAGE

TECHNICAL FIELD

The invention relates to determining an action to be performed to allow operation of a wind turbine to be restarted or resumed after a stoppage and, in particular, after a stoppage caused by the wind turbine entering an alarm state when an error associated with the wind turbine operation has occurred.

BACKGROUND

Wind turbines typically have built-in fault or error detection that can be triggered based on various parameters associated with the wind turbine and its operation, and for various reasons. For certain types of detected faults—i.e. certain error states—a typical action that may be taken is for the wind turbine to automatically stop operation—i.e. automatically shut down—until the detected fault has been resolved.

In order to resolve a detected fault, one or more service personnel may be dispatched to the site at which the wind turbine is located to perform maintenance. In some cases, a fault is detected incorrectly ('false alarm') where a cause of the detected fault is not as a result of a mechanical or electrical problem, but possibly as a result of a particular combination of circumstances and timing that leads to a fault being detected incorrectly.

In both cases, a detected fault may be resolved remotely by reconfiguring and/or restarting the wind turbine using human input. In particular, one or more technicians may analyse various data associated with the wind turbine and its operation to identify if and how a detected fault can be resolved remotely. This is beneficial as it reduces the amount of time the wind turbine is stopped, i.e. reduces the amount of lost energy production, because the issue can be resolved without needing to wait for service personnel to become available and to travel to the wind turbine site, for instance.

However, such data analysis can be complex and can require expert knowledge to distinguish between when a problem can be successfully resolved remotely or when an on-site service team is needed. For instance, if a remote restart of the wind turbine is applied in a situation where it is not appropriate then this can result in damage to one or more components of the wind turbine. This could cause a more severe problem that results in increased repair costs, increased downtime (i.e. increased energy production loss), and excess component wear.

It is against this background to which the present invention is set.

SUMMARY OF THE INVENTION

According to an aspect of the invention there is provided a computer-implemented method for a (first) wind turbine. The method comprises receiving alarm state data indicating that the wind turbine has entered an alarm state in which operation of the wind turbine has stopped. The method comprises receiving sensor data from a plurality of sensors of the wind turbine indicative of operating conditions associated with the wind turbine. The method comprises, when the alarm state data is received, executing a trained machine learning model based on the received sensor data and the alarm state to obtain an output. The received sensor data that is used for this purpose may be sensor data relating to operating conditions within a defined period relative to the alarm state being entered or generated. For instance, the defined period may include a defined amount of time prior to the alarm state and/or a defined amount of time after the alarm state being generated. The machine learning model is trained based on historical data associated with a plurality of (second) wind turbines, the historical data including data related to the plurality of wind turbines previously being in the alarm state. The plurality of second wind turbines may or may not include the first wind turbine. The method comprises providing, based on the obtained output, an action to be performed to allow the wind turbine to resume operation.

The historical data may be a training data set linking sensor data indicative of operating conditions when the wind turbine has previously been in the alarm state to actions performed in response to the wind turbine being in the alarm state.

The training data set may be labelled with a result of the action performed in response to each previous occurrence of the alarm state. The result may indicate whether the performed action resolved the alarm state. In this manner, the labelling of the training data is done by a wind turbine control system as part of its normal procedure of maintaining an event/alarm log, and the labels are ensured to be correlated to an actual wind turbine state and/or condition.

The method may comprise identifying the plurality of sensors from an overall set of sensors of the wind turbine. The plurality of sensors may be identified based on a degree to which the associated sensor data influenced the performed action in previous alarm states. The method may comprise including the sensor data associated with the identified plurality of sensors in the training data set. The method may comprise training the machine learning model based on the training data set.

The method may comprise monitoring one or more parameters indicative of wind turbine operation after the action has been performed to determine a result indicating whether the alarm state has been resolved. If the alarm state has not been resolved, then the method may comprise providing a further action to be performed to allow the wind turbine to resume operation.

The further action may be determined based on the performed action that did not resolve the alarm state.

The result may indicate one or more of whether: an error state of the wind turbine that caused the alarm state has been resolved in response to the performed action; the error state reoccurs within a defined period after the action has been performed; optionally wherein the results indicates the time until the error state reoccurs; and, a different error state occurs within a defined period after the action has been performed.

The method may comprise updating the training data set by adding the received sensor data, the provided action, and the determined result thereto. The method may comprise retraining the machine learning model based on the updated training data set.

The action may comprise automatically controlling the wind turbine to resume operation. The action may comprise automatically adjusting a setting of one or more components of the wind turbine. The action may comprise automatically adjusting a mode of operation of the wind turbine. The action may comprise automatically dispatching service personnel to a site of the wind turbine. The action may comprise providing a notification that human input is needed to allow the wind turbine to resume operation. Optionally, the human input may include dispatching service personnel to a site of the wind turbine. The action may comprise adjusting one or more parameter threshold values defining when the wind turbine enters the alarm state.

The output may be in the form of a selection of one action from a plurality of possible actions that may be performed. The output may be in the form of a likelihood of success associated with each of the respective possible actions, the likelihood of success indicating a likelihood that the respective action will resolve the alarm state.

The alarm state may be caused by the wind turbine entering an error state. The trained machine model may be executed further based on received event data, wherein the event data may include data relating to one or more events in which the wind turbine previously entered the error state but operation of the wind turbine was not stopped.

The machine learning model may be trained based on the received event data.

The operating conditions associated with the wind turbine may include one or more of: wind speed in the vicinity of the wind turbine; wind direction in the vicinity of the wind turbine; a level of turbulence in the vicinity of the wind turbine; ambient temperature in the vicinity of the wind turbine; humidity in the vicinity of the wind turbine; one or more loads experienced by one or more rotor blades of the wind turbine; and, an acceleration of one or more components of the wind turbine.

The received sensor data may include data from sensors of one or more further wind turbines indicative of operating conditions associated with the respective wind turbines; optionally wherein the further wind turbines are located at a same wind park as the wind turbine. The received sensor data may include data from one or more sensors of a wind park at which the wind turbine is located, indicative of one or more operating conditions associated with the wind park.

The machine learning model may be a neural network model. Training the model may include adjusting one or more weights or other parameters of an architecture of the neural network model based on the historical data.

According to another aspect of the invention there is provided a non-transitory, computer-readable storage medium storing instructions thereon that when executed by one or more computer processors causes the one or more computer processors to perform the method described above.

According to another aspect of the invention there is provided a controller for a wind turbine. The controller is configured to receive alarm state data indicating that the wind turbine has entered an alarm state in which operation of the wind turbine has stopped. The controller is configured to receive sensor data from a plurality of sensors of the wind turbine indicative of operating conditions associated with the wind turbine. The controller is configured to, when the alarm state data is received, execute a trained machine learning model based on the received sensor data and the alarm state to obtain an output. The machine learning model is trained based on historical data associated with a plurality of wind turbines, the historical data including data related to the plurality of wind turbines previously being in the alarm state. The controller is configured to provide, based on the obtained output, an action to be performed to allow the wind turbine to resume operation.

According to another aspect of the invention there is provided a wind turbine comprising a controller as described above.

BRIEF DESCRIPTION OF THE DRAWINGS

One or more examples of the invention will now be described with reference to the accompanying drawings, in which.

DETAILED DESCRIPTION

Figure 1:
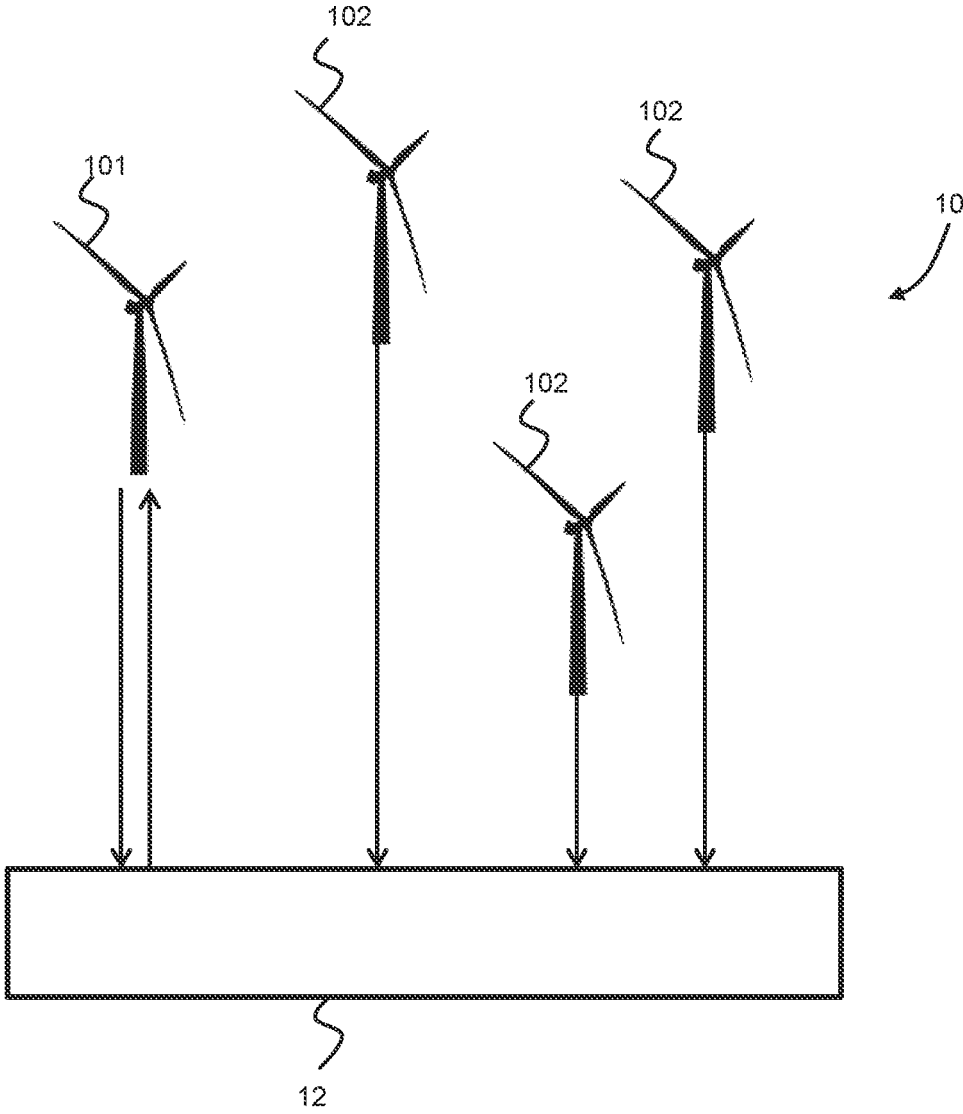
FIG. 1 schematically illustrates a wind turbine that is part of a wind park including a plurality of wind turbines.

The invention provides a method and system for using a machine learning (ML) or artificial intelligence (AI) model to determine feasible and appropriate corrective actions to be performed when an error occurs with the operation of a wind turbine such that the wind turbine enters an alarm state in which the wind turbine is automatically stopped or shut down. In particular, the corrective action is for allowing operation of the wind turbine to be resumed (i.e. the wind turbine to be restarted).

The ML model analyses various data associated with the wind turbine and its operation in order to determine or select an appropriate action to be taken. In particular, the ML model bases its determination on historical data associated with previous instances of the wind turbine entering an alarm state. Specifically, the ML model takes into account data associated with wind turbine operation when the previous alarm states occurred, any actions taken in response to those previous alarm states, and the success of these actions in resolving the previous alarm states, in order to select an appropriate action for addressing a current alarm state.

By making use of an ML model to analyse vast amounts of historical data related to previous alarm states, a greater level of analysis may be performed to gain greater insights of which actions are appropriate in which conditions (e.g. operating/environmental conditions) when an alarm state occurs than would be possible when actions are selected manually, e.g. by a technician, even when the manual analysis is performed by one or more experienced professionals with expert knowledge. In previous methods, it may be the case that only scenarios in which there is a clear correlation between events, actions and results may be automated. For instance, attempting a turbine restart after a number of previous failed restart attempts for the same error/alarm state may clearly not be an appropriate action. On the other hand, a particular and complex combination of operating conditions of the wind turbine may or may not make it appropriate to attempt an automatic turbine restart for a given error/alarm state, and it is difficult or impossible for this to be ascertained by human analysis or deterministic approaches.

Either immediately after a wind turbine enters an alarm state, or after a suitable 'cool down' period, it can (at least sometimes) be difficult for a technician to decide which action is appropriate to take in response to the wind turbine shut down, such as deciding whether the problem can be successfully resolved remotely or whether service personnel need to be dispatched to the wind turbine site to perform maintenance. Indeed, remote restarts can, when applied in an inappropriate situation, cause equipment damage, thereby further increasing time and costs associated with the wind turbine shut down. Furthermore, if a technician is not able to remotely solve the problem then this results in a waste of time for individuals involved.

The present invention is advantageous in that it reduces the amount of down time of a wind turbine, i.e. it reduces the amount of time that a wind turbine is stopped. In turn, this increases the amount of time the wind turbine spends harvesting energy from the wind, thereby increasing annual energy production (AEP). The invention is also advantageous in that it can alleviate stress and loading on physical/mechanical components as it guards against turbine restarts in cases that may lead to more severe failures. It achieves these advantages by utilising an ML model that is trained on historical data relating to wind turbine stoppages to determine an appropriate action—i.e. an action that is safe and likely to resolve the problem—given the current operating conditions of a wind turbine when an alarm state occurs. An example illustrating the invention is outlined in the following.

FIG. 1 schematically shows a wind park or wind farm 10 that includes a plurality of wind turbines. In particular, the wind park 10 includes a (first) wind turbine 101 and a number of other (or second) wind turbines 102 located on the site of the wind park 10 and distributed adjacently thereto. Each wind turbine 101, 102 captures energy from the wind to generate power. As is typical, each wind turbine 101, 102 will include a tower, a nacelle atop the tower housing various mechanical and electrical components, and a rotor with a plurality of rotor blades (typically three) mounted thereto.

Each wind turbine 101, 102 has a number of sensors associated therewith for measuring and monitoring various aspects related to current operating conditions of the respective wind turbine 101, 102. A modern wind turbine may have over one hundred different sensors, e.g. about 150 sensors, for measuring different factors. These typically include sensors for measuring aspects of the wind conditions in which the wind turbine is operating, the loads being experienced by different components of the wind turbine, and the movement, e.g. acceleration, of various components of the wind turbine. The data received from the wind turbine sensors is used to control operation of the respective wind turbine, e.g. to control the wind turbine to operate in an appropriate mode of operation, for instance to minimise component loading and/or to maximise energy production.

The wind turbines 101, 102 will have one or more respective controllers associated therewith to automatically control operation of the wind turbines based on data received from the various sensors. For instance, the controllers may be used to adjust a pitch angle of the rotor blades (collectively and/or individually) and/or control a speed of a generator housed in the nacelle of the turbine.

The wind turbines will have a number of different error states associated with their operation. Typically, hundreds or even thousands of such error states may be possible for a given wind turbine. For instance, such error states may be a result of the failure of one or more of the wind turbine sensors, failure of a wind turbine component, excessive loading being experienced by a wind turbine component, extreme weather conditions in the vicinity of the wind turbine, etc. When a fault or error state is detected or determined by the wind turbine, the associated controller may automatically take action in response to the fault detection. For some error states, it may be determined that the wind turbine cannot continue to operate in a safe or reliable manner such that the controller automatically causes the wind turbine to enter an alarm state in which wind turbine operation is stopped. The wind turbine may then only be restarted when it is determined to be appropriate to do so via human input, e.g. once service personnel have performed on-site maintenance and/or a technician has deemed it appropriate to remotely initiate resumption of wind turbine operation. Such remote control of the wind turbine may be performed from a remote control or operations centre off-site from the wind park 10.

FIG. 1 schematically illustrates a control system or controller 12 in accordance with an example of the invention. In the described example, the controller 12 is located remotely from the wind park 10, e.g. at or near to an operations centre where one or more technicians are located. The controller 12 is arranged to receive data indicative of measurements taken by the various sensors of each wind turbine 101, 102 over time. This may be stored by the controller 12, or a data repository/memory accessible by the controller 12. In particular, the received sensor data may be stored in the form of an events log/database. For instance, the sensor data received from a particular wind turbine when a certain event occurred is labelled as being associated with that event, where the event may for instance be the wind turbine entering an alarm state in which wind turbine operation is stopped. The events log may additionally include details of what actions were taken in response to a particular recorded event, e.g. the wind turbine was restarted remotely, service personnel were dispatched to the wind turbine site, etc. In particular, these may be actions that were performed automatically by the wind turbine, or actions initiated by human interaction, e.g. a remote technician. Furthermore, the events log may include details of whether a performed action associated with a given event was successful in overcoming the problem associated with the event, e.g. whether the performed action resolved the problem such that wind turbine operation could resume, whether the same or a different error arose because of the performed action, etc.

Over time, the events data and action log builds up an extensive database linking sensor data to actions for various wind turbine events, and an indication of the relative success of such actions. While this log may be used in some known methods by technicians to decide what manually-initiated action to take in response to different wind turbine events, the data is extensive and complex such that it may be difficult or not possible for a human to properly and accurately analyse the log for this purpose.

The invention therefore uses an ML model to utilise the log that has built up over time, e.g. several years, to learn which actions are appropriate in which situations, and to determine an appropriate action to be taken when a new event, e.g. an alarm state, occurs in association with one of the wind turbines based on this historical data stored in the log. In particular, the ML model may map or link sensor data as an input to possible actions as an output. Using the events log as a training data set, the ML model may be trained to determine the most appropriate action to take in a particular situation.

The ML model may for instance be a neural network model that takes sensor data as input, and provides actions as output. Training the ML model may involve adjusting values of weights or other parameters/hyperparameters of the model architecture using forward and backward propagation techniques based on the training data set. For a particular situation (particular set of sensor data), actions that were successful in resolving a problem in a given situation may be weighted more heavily than those that were less, or not, successful. Any suitable type of neural network model may be used, for instance a recurrent neural network, a convolutional neural network, an artificial neural network, etc. Alternatively, the ML model may use a different type of ML algorithm from a neural network, and may be any suitable type of supervised, unsupervised or reinforcement learning algorithm. For instance, the ML model may make use of algorithms based on linear regression, logistic regression, naïve Bayes, k nearest neighbour, random forest, support vector machine, etc.

Of the data available from the vast number of different sensors on the wind turbines, it may be that the data from only a subset of the overall set of sensors is used to train the ML model. It may be that the data of only certain ones of the sensors actually influence which actions are appropriate in a given situation. By selecting and using only the relevant sensors and their data for training the ML model, a dimensionality of the input layer of the ML model may be reduced, thereby reducing the complexity and processing requirements associated with the ML model.

The sensor data to be used as input to the ML model is therefore known/specified. The list of possible actions that are output by the ML model are also known/specified. This allows the ML model to be devised in an appropriate manner. The possible actions that may be taken in response to wind turbine shut down may include automatically controlling the wind turbine to resume operation (e.g. if the ML model determines that the decision to stop the wind turbine was incorrect), or automatically adjusting a setting of one or more components of the wind turbine (e.g. blade pitch angle). The action may comprise automatically adjusting a mode of operation of the wind turbine 101. For instance, the mode may be changed to reduce a maximum power of the wind turbine 101 to a lower value, e.g. 80% of maximum capacity. The wind turbine 101 may then be able to operate in this derated power mode until such time as the error can be more fully investigated/addressed, e.g. by on-site service personnel. These automatic actions may be in the form of control signals transmitted to the wind turbine from the controller 12. The possible actions that may be taken may include providing a notification that human input is needed to allow the wind turbine to resume operation. For instance, it may be deemed that the problem cannot be resolved remotely and that service personnel need to be dispatched to the wind turbine site. Alternatively, the human input may be to confirm that a suggested action (such as remote restart) is appropriate in a given situation. The possible actions may further include adjusting one or more parameter threshold values defining when the wind turbine enters the alarm state. For instance, it may be determined that the particular operating conditions (as ascertained from sensor data) which resulted in an alarm state are not in fact conditions that need wind turbine operation to cease, in which case the thresholds that define and trigger certain error states may be tweaked so that the wind turbine is shut down in future only when it actually needs to be.

Figure 2:
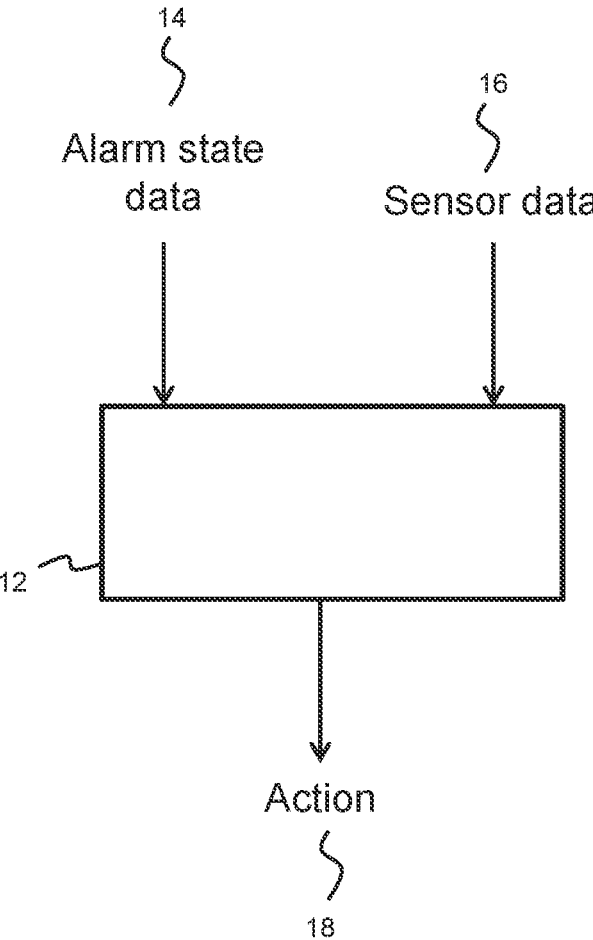
FIG. 2 schematically illustrates a controller for the wind turbine of FIG. 1 in accordance with an example of the invention; and, FIG. 3 illustrates steps of a method performed by the controller of FIG. 2 in accordance with an example of the invention.

FIG. 2 schematically illustrates the inputs to and outputs from the controller 12 when it is used to determine how to resolve a problem with the wind turbine 101. The invention is related to how to address a problem that has resulted in the wind turbine 101 being shut down such that (at least part of) its operation has been stopped or paused. The controller 12 therefore is arranged to receive so-called alarm state data from the wind turbine 101 (or, specifically, a controller thereof). As outlined above, certain fault or error states detected by the wind turbine 101 cause it to enter an alarm state in which the wind turbine 101 shuts down. The controller 12 therefore needs to know when the wind turbine 101 enters such an alarm state, as this is when the controller 12 is used to determine an action to take in response.

The controller 12 is also arranged to receive sensor data 16 as described above. This sensor data may include data from all available sensors on the wind turbines 101, 102. Alternatively, the controller 12 may only receive data from sensors that are used to determine which action is to be performed in response to a wind turbine alarm state. The wind turbine sensors used for this purpose may be determined to be any suitable combination of the available sensors. For instance, the sensor data to be used may include data relating to wind speed and/or direction in the vicinity of the wind turbine 101, and/or a level of turbulence, ambient temperature, and/or humidity in the vicinity of the wind turbine 101. The sensor data may include loads experienced by one or more rotor blades of the wind turbine 101, e.g. extreme and/or fatigue loads in edgewise and/or flapwise directions, and/or an acceleration of one or more components of the wind turbine 101, e.g. side-to-side acceleration of the wind turbine tower. The sensor data may also include rotor speed data, shock sensor data, temperature data of turbine components, such as converter, generator, gearbox, hydraulic oil, and/or hydraulic oil pressure data, etc.

The sensor data to be used to determine actions to be taken in response to a wind turbine shut down may be limited to data from sensors of the wind turbine 101 that has entered the alarm state. However, in different examples the determination (using the ML model) may additionally make use of sensor data obtained from other wind turbines 102 adjacent or near to the wind turbine 101 under consideration, e.g. other wind turbines 102 located at the same wind park 10 as the wind turbine 101 of interest. Furthermore, sensors associated with the wind park 10 itself rather than individual wind turbines 101, 102 of the wind park 10 may be received by the controller 12 and used in the determination of what action to perform in response to an alarm state of the wind turbine 101. For instance, such a wind park sensor may include a sensor for measuring one or more aspects of the weather conditions at the wind park 10.

The ML model is therefore trained on historic events of a fleet or collection of wind turbines, e.g. the turbines 101, 102 in the wind park 10. The data used to train the ML model may be the data from the events log that stores data associated with historic events experienced by each of the wind turbines in the collection of wind turbines. In particular, the events log includes data relating to events in which the wind turbines have previously entered an alarm state in which the respective wind turbine was automatically shut down, as well as the actions taken in response to the shut down and details of whether the actions was successful in overcoming the alarm state. Unsuccessful actions may be used to train the ML model as well as successful ones. In the case in which the ML model is a neural network having an input layer, a number of hidden layers, and an output layer, training the ML model may be performed using techniques known in the art. For instance, instances of training (labelled) data—e.g. each relating to a single alarm state event from the event log—may include model input data (e.g. sensor data, turbine metadata, etc.) and output data (e.g. action performed). The input data for a particular instance may be input to the model input layer and executed by the model to obtain an output. The obtained output may be compared to the actual output data in the training data, and then may be back propagated back through the model to adjust model weights, hyperparameters, etc. to train the model to provide the 'correct' outputs for the training data. Once trained, the ML model can be used to predict or suggest outputs for real-time event input data.

Figure 3:
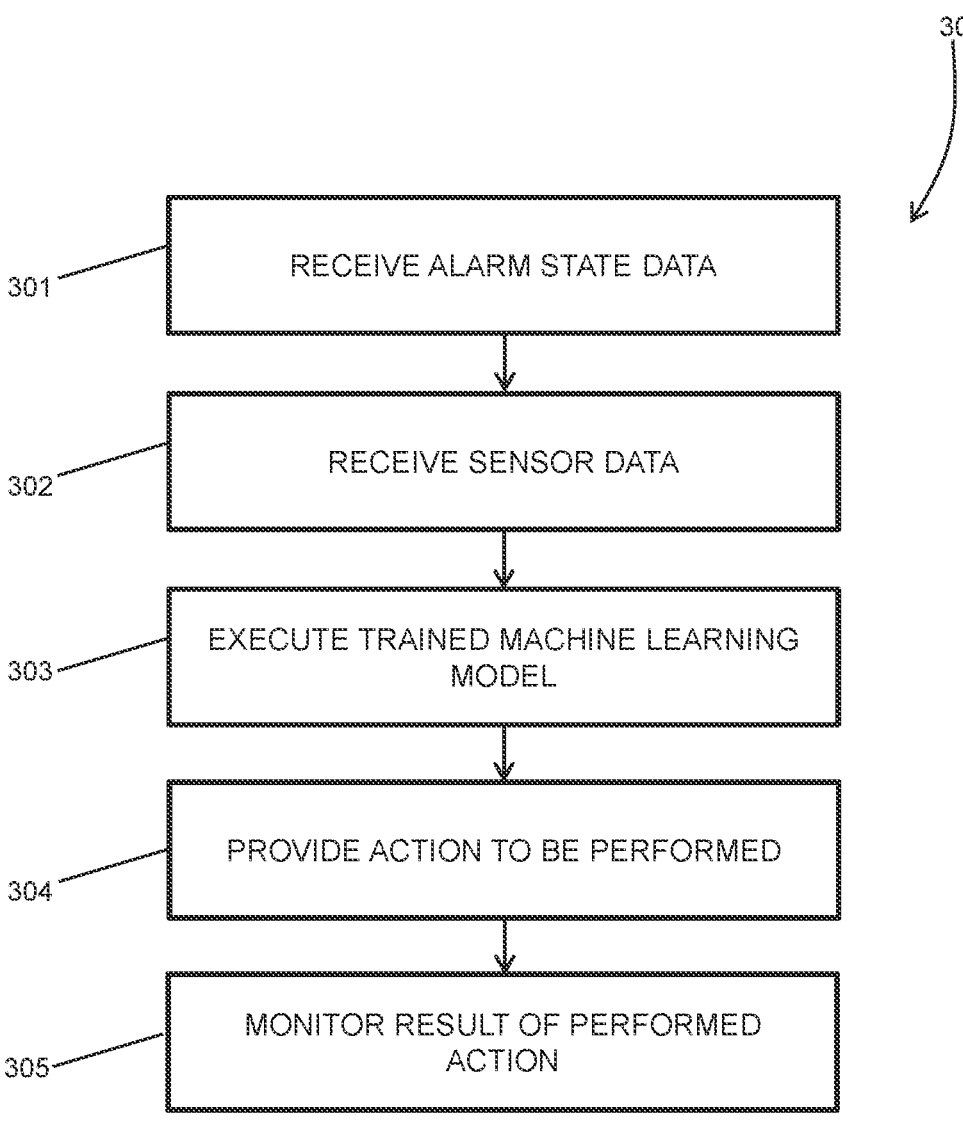

FIG. 3 summarises the steps of a method 30 performed by the controller 12 in accordance with the invention. At step 301, the method 30 involves receiving alarm state data indicating that the wind turbine 101 has entered an alarm state in which operation of the wind turbine 101 has stopped. This could mean that the wind turbine 101 has completely shut down, or could mean that certain parts of the wind turbine operation—such as the operation of certain components—has ceased. The alarm state data may be received only when the wind turbine 101 enters the alarm state, or this data could be in the form of continuous or periodic updates regarding the state or status of the wind turbine 101.

At step 302, the method 30 involves receiving sensor data from a plurality of sensors of the wind turbine 101 indicative of operating conditions associated with the wind turbine 101. As mentioned above, sensor data from other wind turbines 102 (e.g. at the same wind park 10) may additionally be received, as may sensor data from sensors associated with the wind park 10 itself. The sensor data may typically be received substantially continuously or periodically by the controller 12, and not just when alarm state data is received.

When the controller receives the alarm state data at step 301, at step 303 the method 30 involves executing a trained ML model based on the sensor data received at step 302 to obtain an output. The ML model is trained based on historical data associated with a plurality of wind turbines, where the historical data is indicative of the plurality of wind turbines previously being in the alarm state. The plurality of wind turbines may include the wind turbine 101 under consideration. The plurality of wind turbines may be a fleet of wind turbines, such as each of the wind turbines from a particular wind park 10. The historical data may be a training data set linking sensor data indicative of operating conditions when the wind turbine 101 has previously been in the alarm state to actions performed in response to the wind turbine 101 being in the alarm state. That is, the historical data may be the data stored in the events log. The training data set may be labelled with a result of the action performed in response to each previous occurrence of the alarm state, where the result indicates whether the performed action resolved the alarm state. The ML model may therefore be trained to favour certain actions for certain operating conditions where it has been found previously that such actions are suitable for resolving the alarm state in similar operating conditions.

The appropriate action for a given wind turbine error or fault may not always be the same action for all operating conditions. For instance, for a wind turbine fault associated with a rotor blade load sensor that leads to an alarm state, then if the wind conditions in the vicinity of the wind turbine are relatively benign, e.g. wind speed below a certain threshold value, then it may be appropriate to cause an automatic restart of the wind turbine. On the other hand, if the wind speed is greater than the threshold value, then such an action may not be appropriate. Instead, it may be that some degree of human input is instead needed.

The trained ML model may be stored in a memory and retrieved by the controller 12 to be executed at step 303. Executing the ML model involves inputting the sensor data indicative of operating conditions, and optionally the particular alarm state, at an input layer of the model, and then obtaining an output indicative of one or more actions to be taken at an output layer of the model. The sensor data used for this purpose may be sensor data collected or received within a particular timeframe relative to when the wind turbine entered the alarm state. For instance, the sensor data may include data received in a certain time interval immediately before the alarm state and/or a certain time interval immediately after the alarm state was entered, i.e. immediately after the wind turbine was shut down. The model may receive additional data at the input layer for executing the trained ML model. For instance, in addition to the described sensor data, metadata associated with the particular specification of the wind turbine 101 under consideration may be included. In one example, the maximum rated wind speed of the wind turbine 101 may be used as input data to the ML model. It may be that it is appropriate to attempt a restart of the wind turbine 101 if the monitored wind speed is a certain amount below the maximum rated wind speed. In this way, sensor data (indicative of actual wind speed) and metadata can be combined in the ML model when determining an appropriate action. As mentioned above, the various possible actions that may be taken are known. The output obtained by executing the ML model may be in the form of a binary result indicating one of the possible actions. Alternatively, the output may be in form of a probability associated with each possible action indicating the probability of success of the action, or some other measure of the particular action's appropriateness in the given circumstances.

At step 304, the method involves providing an action to be performed to allow the wind turbine 101 to resume operation, based on the output obtained from executing the trained ML model. For instance, this may the action associated with the highest probability of success in the output obtained from the ML model.

After the provided action has been performed, at step 305 the method 30 may involve monitoring certain parameters indicative of operation of the wind turbine 101. This is to determine a result indicating whether the alarm state has been resolved by taking the particular action. This may involve monitoring the wind turbine 101 for a certain period of time after the action has been performed, e.g. substantially continuously, periodically, or as a one-off after the certain period of time has elapsed.

The result may indicate that the error state of the wind turbine 101 that caused the alarm state has been resolved in response to the performed action. In this case, the method 30 may be regarded as complete until another alarm state signal is received.

On the other hand, the result may indicate that the alarm state has not been resolved. In one example, it may be that the performed action at no point addressed or overcame the relevant fault or error. In other examples, it may be that the relevant error was briefly resolved before returning with a prescribed period, meaning that overall the action was not successful. In further examples, it may be that an error or fault that led to the alarm state has been overcome by the performed action, but that a different error or fault has arisen as a result of this. Again, overall in this case the performed action may not be regarded as successful in allowing the wind turbine 101 to resume operation.

If overall the alarm state has not been resolved, then the method may involve providing a further action to be performed to allow the wind turbine 101 to resume operation. This may involve determining the further action from the same output of the executed ML model, e.g. selecting the next most appropriate action (after the performed action). Alternatively, this may involve taking the initially-performed action into account to determine a further action.

The actions taken as a result of performing the described method may be used to update the training data set used to train the ML model. In particular, the sensor data on which the determination was based, the action taken, and the (monitored) result of the action taken may be added to the training set as a new (alarm state) event. The ML model may then be retrained based on the updated training set before the trained ML model is executed again as part of the described method. In this way, the ML model develops and improves over time as more training data is acquired.

The controller 12 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

Many modifications may be made to the described examples without departing from the scope of the appended claims.

In the above-described example, the controller for receiving sensor data and determining an action to be performed is located remote from the wind turbine (wind park). It will be understood, however, that in different examples such a controller may be part of/located in the wind turbine of interest, or located somewhere else within the wind park at which the wind turbine is located.

The invention claimed is:

1. A computer-implemented method for a wind turbine, the method comprising:
   receiving alarm state data indicating that the wind turbine has entered an alarm state in which operation of the wind turbine has stopped;
   receiving sensor data from a plurality of sensors of the wind turbine indicative of operating conditions associated with the wind turbine;
   executing a trained machine learning model based on the received sensor data and the alarm state data to obtain an output, wherein the trained machine learning model is trained on historical data associated with a plurality of wind turbines, and wherein the historical data includes data related to the plurality of wind turbines previously being in the alarm state;
   based on the obtained output, performing an action to allow the wind turbine to resume operation, wherein the action comprises adjusting a pitch angle of rotor blades for the wind turbine or adjusting a speed of a generator in a nacelle of the wind turbine;
   monitoring one or more parameters indicative of wind turbine operation after the action has been performed to determine a result indicating whether the alarm state has been resolved, wherein the result indicates an error state will reoccur within a defined period after the action has been performed, and wherein the result indicates a time until the error state reoccurs;
   in response to determining the alarm state has not been resolved, providing a further action to be performed to allow the wind turbine to resume operation, wherein the further action is determined based on the performed action that did not resolve the alarm state; and
   in response to performing the further action, resuming operation of the wind turbine.

2. The method of claim 1, the historical data being a training data set linking sensor data indicative of operating conditions when the wind turbine has previously been in the alarm state to actions performed in response to the wind turbine being in the alarm state.

3. The method of claim 2, wherein the training data set is labelled with a result of the action performed in response to each previous occurrence of the alarm state, and wherein the result indicates whether the performed action resolved the alarm state.

4. The method of claim 2, further comprising:
   generating a new training data set with data from the plurality of sensors from an overall set of sensors of the wind turbine based on a degree to which the sensor data influenced the performed action in previous alarm states; and
   training the trained machine learning model based on the new training data set.

5. The method of claim 1, wherein the result further indicates a different error state occurs within the defined period after the action has been performed.

6. The method of claim 1, further comprising:
   updating training data set by adding the received sensor data, the performed action, and the determined result thereto;
   retraining the trained machine learning model based on the updated training data set; and
   wherein the historical data is the training data set linking sensor data indicative of operating conditions when the wind turbine has previously been in the alarm state to actions performed in response to the wind turbine being in the alarm state.

7. The method of claim 1, wherein the further action comprises:
   automatically controlling the wind turbine to resume operation;
   automatically adjusting a setting of one or more components of the wind turbine;
   automatically adjusting a mode of operation of the wind turbine;
   automatically dispatching service personnel to a site of the wind turbine;
   providing a notification that human input is needed to allow the wind turbine to resume operation, wherein the human input includes dispatching service personnel to the site of the wind turbine; or
   adjusting one or more parameter threshold values defining when the wind turbine enters the alarm state.

8. The method of claim 1, wherein the output is:
   a selection of one action from a plurality of possible actions that may be performed; or
   a likelihood of success associated with each of the respective possible actions, the likelihood of success indicating a likelihood that the respective action will resolve the alarm state.

9. The method of claim 1, wherein the alarm state is caused by the wind turbine entering the error state, wherein the trained machine learning model is executed further based on received event data, and wherein the received event data includes data relating to one or more events in which the wind turbine previously entered the error state but operation of the wind turbine was not stopped.

10. The method of claim 9, wherein the trained machine learning model is trained based on the received event data.

11. The method of claim 1, wherein the trained machine learning model is a neural network model, and wherein training the trained machine learning model includes adjusting one or more weights or other parameters of an architecture of the neural network model based on the historical data.

12. A controller for a wind turbine, comprising:

an I/O interface configured for communicative coupling with the wind turbine; and one or more processors configured to:

receive alarm state data indicating that the wind turbine has entered an alarm state in which operation of the wind turbine has stopped;

receive sensor data from a plurality of sensors of the wind turbine indicative of operating conditions associated with the wind turbine;

execute a trained machine learning model based on the received sensor data and the alarm state data to obtain an output, wherein the trained machine learning model is trained on historical data associated with a plurality of wind turbines, and wherein the historical data includes data related to the plurality of wind turbines previously being in the alarm state;

based on the obtained output, performing an action to allow the wind turbine to resume operation, wherein the action comprises adjusting a pitch angle of rotor blades for the wind turbine or adjusting a speed of a generator in a nacelle of the wind turbine;

monitoring one or more parameters indicative of wind turbine operation after the action has been performed to determine a result indicating whether the alarm state has been resolved, wherein the result indicates an error state will reoccur within a defined period after the action has been performed, and wherein the result indicates a time until the error state reoccurs;

in response to determining the alarm state has not been resolved, providing a further action to be performed to allow the wind turbine to resume operation, wherein the further action is determined based on the performed action that did not resolve the alarm state; and in response to performing the further action, resume operation of the wind turbine.

13. The controller of claim 12, wherein the historical data is a training data set linking sensor data indicative of operating conditions when the wind turbine has previously been in the alarm state to actions performed in response to the wind turbine being in the alarm state.

14. The controller of claim 13, wherein the training data set is labelled with a result of the action performed in response to each previous occurrence of the alarm state, and wherein the result indicates whether the performed action resolved the alarm state.

15. A wind turbine, comprising:

a tower;

a nacelle disposed on the tower;

a rotor extending from the tower and having a plurality of blades disposed on a distal end thereof; and a controller configured to perform an operation, comprising:

receive alarm state data indicating that the wind turbine has entered an alarm state in which operation of the wind turbine has stopped;

receive sensor data from a plurality of sensors of the wind turbine indicative of operating conditions associated with the wind turbine;

execute a trained machine learning model based on the received sensor data and the alarm state data to obtain an output, wherein the trained machine learning model is trained on historical data associated with a plurality of wind turbines, and wherein the historical data includes data related to the plurality of wind turbines previously being in the alarm state;

based on the obtained output, performing an action to allow the wind turbine to resume operation, wherein the action comprises adjusting a pitch angle of the plurality of blades for the wind turbine or adjusting a speed of a generator in the nacelle;

monitoring one or more parameters indicative of wind turbine operation after the action has been performed to determine a result indicating whether the alarm state has been resolved, wherein the result indicates an error state will reoccur within a defined period after the action has been performed, and wherein the result indicates a time until the error state reoccurs;

in response to determining the alarm state has not been resolved, providing a further action to be performed to allow the wind turbine to resume operation, wherein the further action is determined based on the performed action that did not resolve the alarm state; and in response to performing the further action, resume operation of the wind turbine.

16. The wind turbine of claim 15, wherein the historical data is a training data set linking sensor data indicative of operating conditions when the wind turbine has previously been in the alarm state to actions performed in response to the wind turbine being in the alarm state.

17. The wind turbine of claim 16, wherein the training data set is labelled with a result of the action performed in response to each previous occurrence of the alarm state, and wherein the result indicates whether the performed action resolved the alarm state.

* * * * *